(12) United States Patent
Kim et al.

(10) Patent No.: US 10,879,817 B2
(45) Date of Patent: Dec. 29, 2020

(54) PAPER-BASED TRIBOELECTRIC NANOGENERATOR AND METHOD OF MANUFACTURING THE SAME

(71) Applicant: INDUSTRY-UNIVERSITY COOPERATION FOUNDATION HANYANG UNIVERSITY, Seoul (KR)

(72) Inventors: Tae Whan Kim, Seoul (KR); Chaoxing Wu, Seoul (KR); Jae Hyeon Park, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/205,940

(22) Filed: Nov. 30, 2018

(65) Prior Publication Data

US 2019/0288613 A1 Sep. 19, 2019

(30) Foreign Application Priority Data

Mar. 13, 2018 (KR) .......................... 10-2018-0029255

(51) Int. Cl.
*H02N 1/04* (2006.01)
*H01M 4/137* (2010.01)
*H02N 1/00* (2006.01)

(52) U.S. Cl.
CPC .............. *H02N 1/04* (2013.01); *H01M 4/137* (2013.01); *H02N 1/004* (2013.01)

(58) Field of Classification Search
CPC ........................ H02N 1/04; H02N 1/00–1/12

USPC ................................................ 310/300, 309
See application file for complete search history.

(56) References Cited

U.S. PATENT DOCUMENTS

2015/0035408 A1    2/2015  Despesse et al.

FOREIGN PATENT DOCUMENTS

| KP | 10-2015-0027415 A | 3/2015 |
| KR | 10-1580409 B1 | 12/2015 |
| KR | 10-2017-0002424 A | 1/2017 |

OTHER PUBLICATIONS

Wu et al., Ultrasoft and cuttable paper-based triboelectric nanogenerators for mechanical energy harvesting, Nano Energy, Dec. 9, 2017. (Year: 2017).*

(Continued)

*Primary Examiner* — Thomas Truong
(74) *Attorney, Agent, or Firm* — Sughrue Mion, PLLC

(57) ABSTRACT

A paper-based triboelectric nanogenerator and a method of manufacturing the same are disclosed. The paper-based triboelectric nanogenerator of the present disclosure includes a sandwich structure including a first paper, conductive papers formed on the first paper and each including an electrode composed of a mesh-type conductive nanomaterial, and a second paper formed on the conductive papers; and a polymer film formed in a selective area on the second paper, wherein the number of the conductive papers formed on the first paper is two; the two conductive papers are formed so as to be spaced apart from each other in the horizontal direction; and the polymer film formed in the selective area is formed only in the upper area of one of the two conductive papers.

10 Claims, 19 Drawing Sheets

(56) References Cited

OTHER PUBLICATIONS

Kequan Xia et al., "Folding triboelectric nanogenerator on paper based on conductive ink and teflon tape", Sensors and Actuators A: Physical, 272, 2018, pp. 28-32.
Yongmin Ko et al., "Flexible supercapacitor electrodes based on real metal-like cellulose papers", Nature Communication, DOI: 10.1038/s41467-017-00550-3.
Communication dated Dec. 21, 2018, issued by the Korean Patent Office in counterpart Korean Patent Application No. 10-2018-0029255.
Sihong Wang et al., "Freestanding Triboelectric-Layer-Based Nanogenerators for Harvesting Energy from a Moving Object or Human Motion in Contact and Non-contact modes", Advanced Materials, 2016, 7 pgs. vol. 26.
Changsheng Wu et al., "Paper-Based Triboelectric Nanogenerators Made of Stretchable Interlocking Kirigami Patterns," ACSNANO, 2016, 8 pgs.
Chaoxing Wu et al., "Ultrasoft and cuttable paper-based triboelectric nanogenerators for mechanical energy harvesting," Nano Energy, 2018, pp. 279-287, vol. 44.
Li Min Zhang et al., "Transparent paper-based triboelectric nongenerator as page mark and anti-theft sensor", Nano Research, ISSN 1998-0124, CN 11-5974/O4, 2014, 16 pgs.

\* cited by examiner

[FIG. 1]
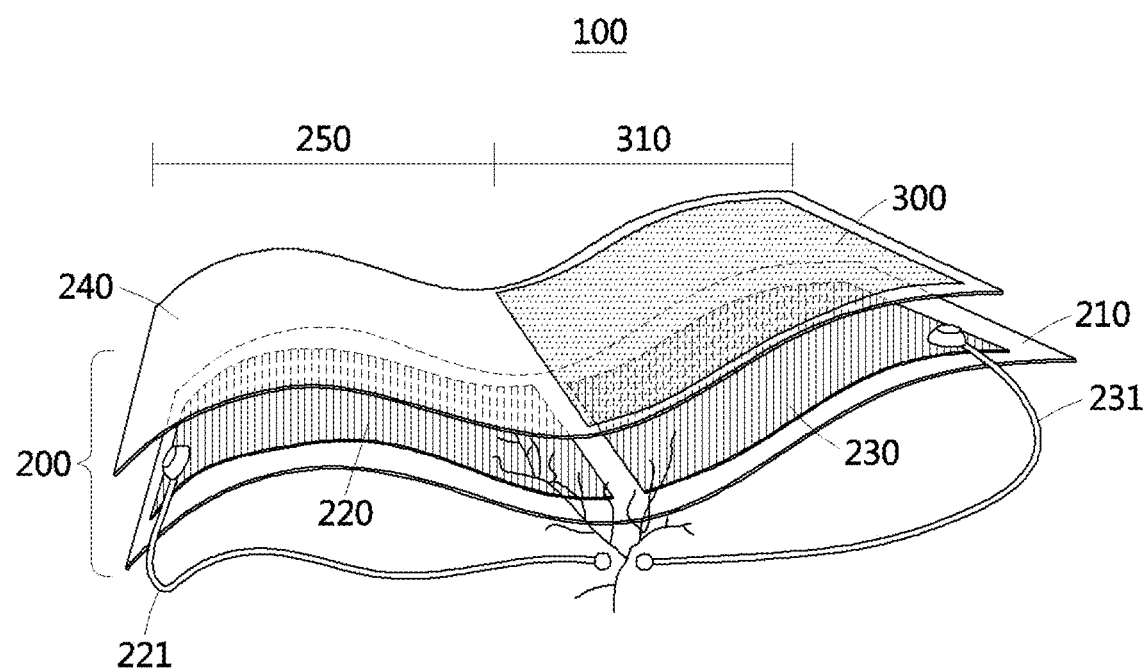
[FIG. 2]
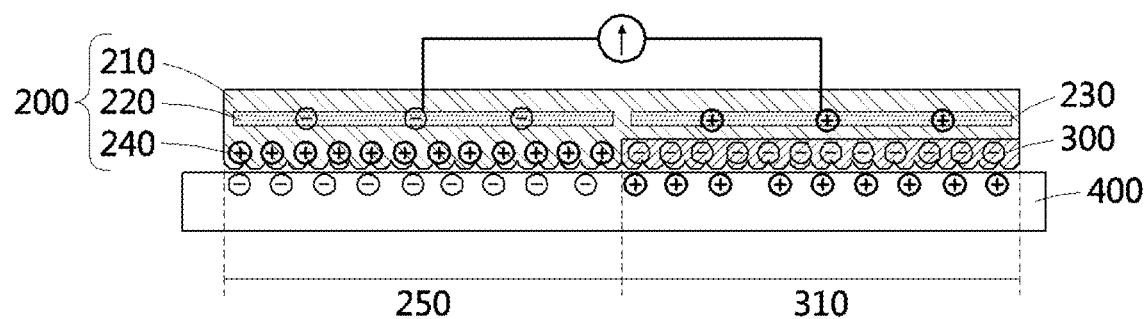

[FIG. 3]
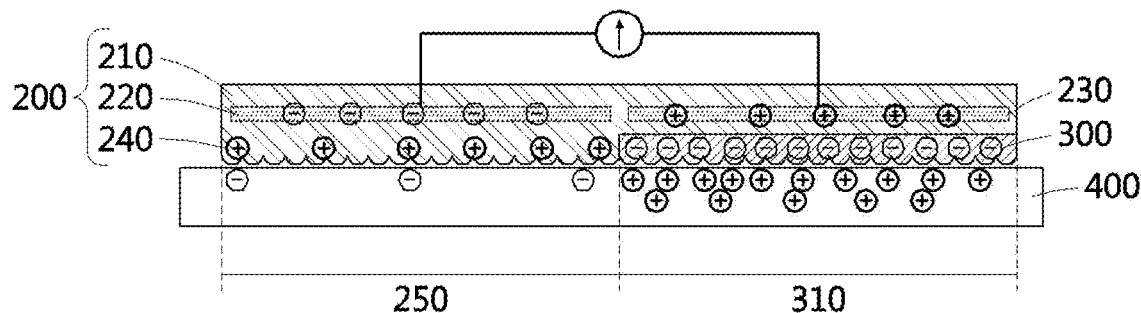
[FIG. 4]
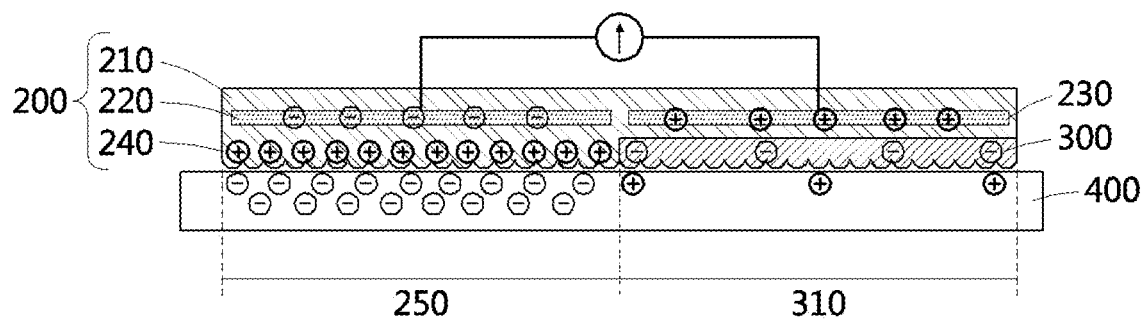
[FIG. 5]
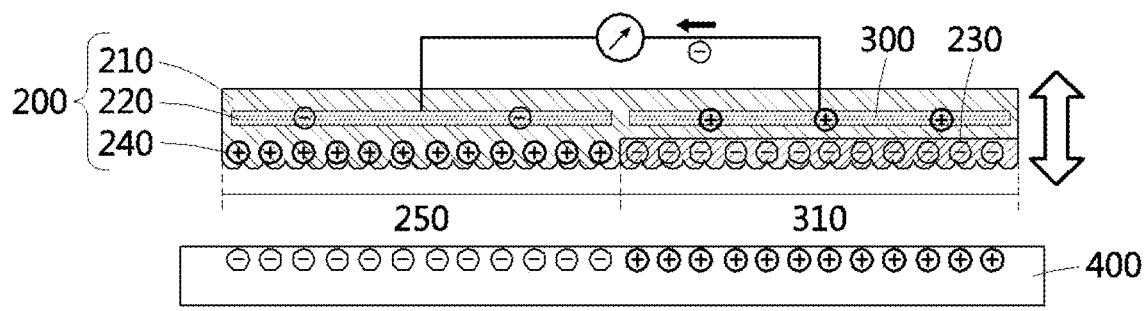

[FIG. 6]
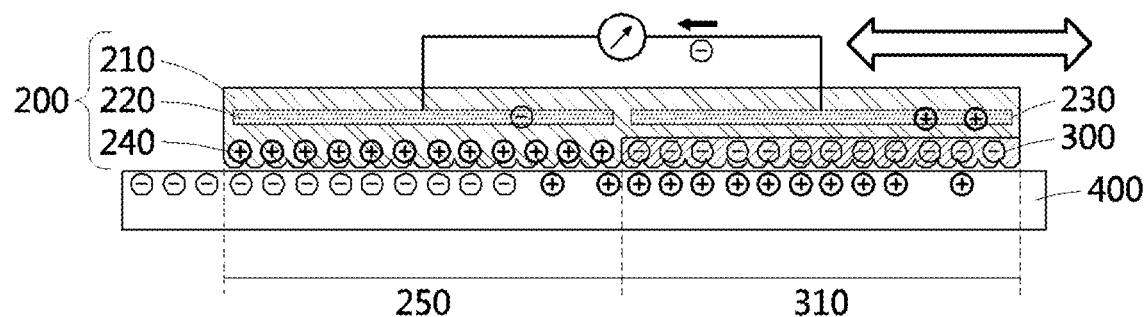
[FIG. 7]
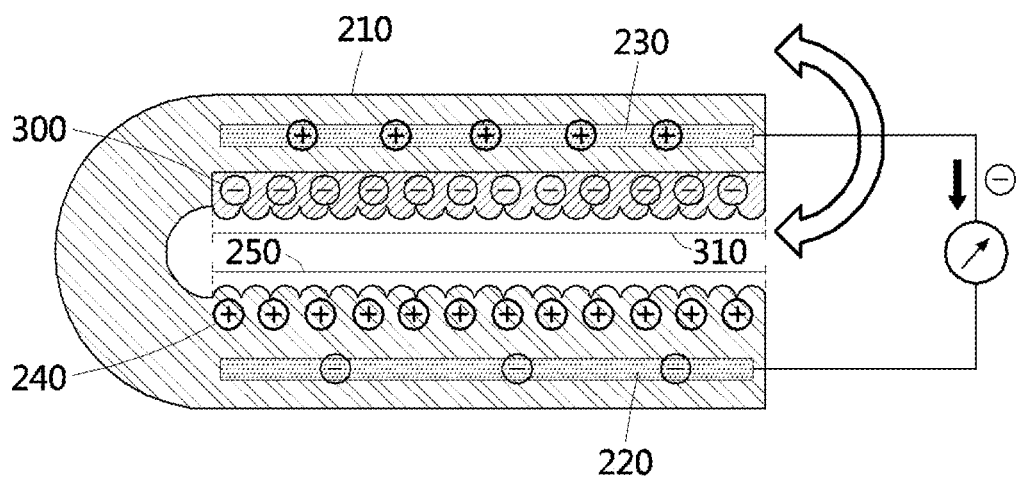

[FIG. 8]
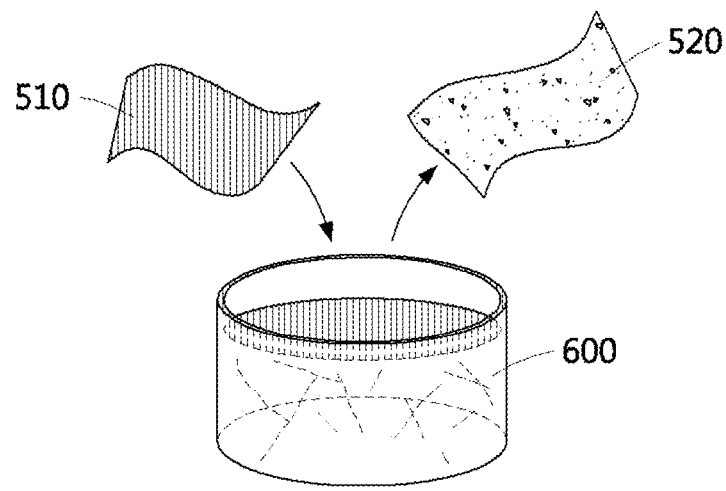
[FIG. 9]
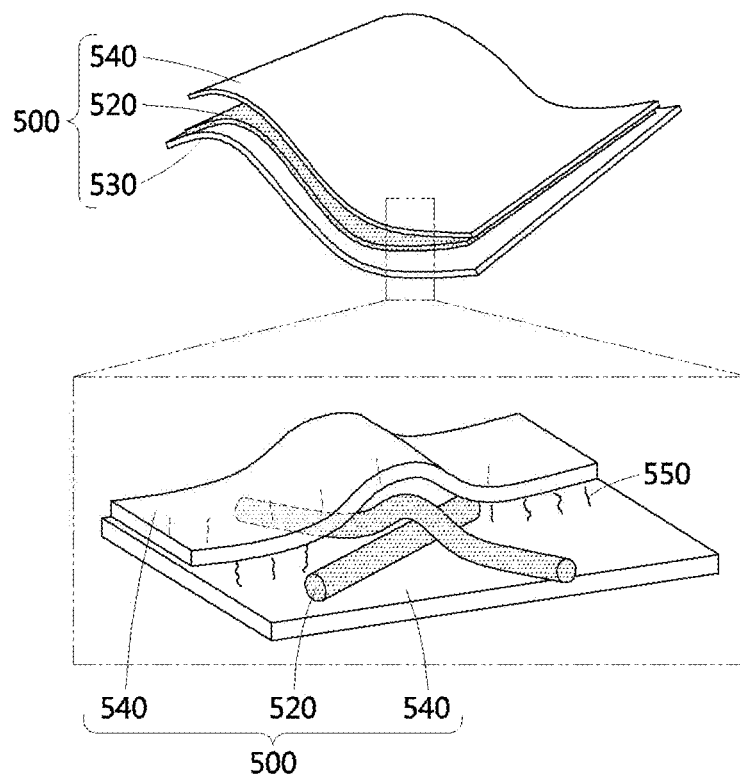

[FIG. 10]
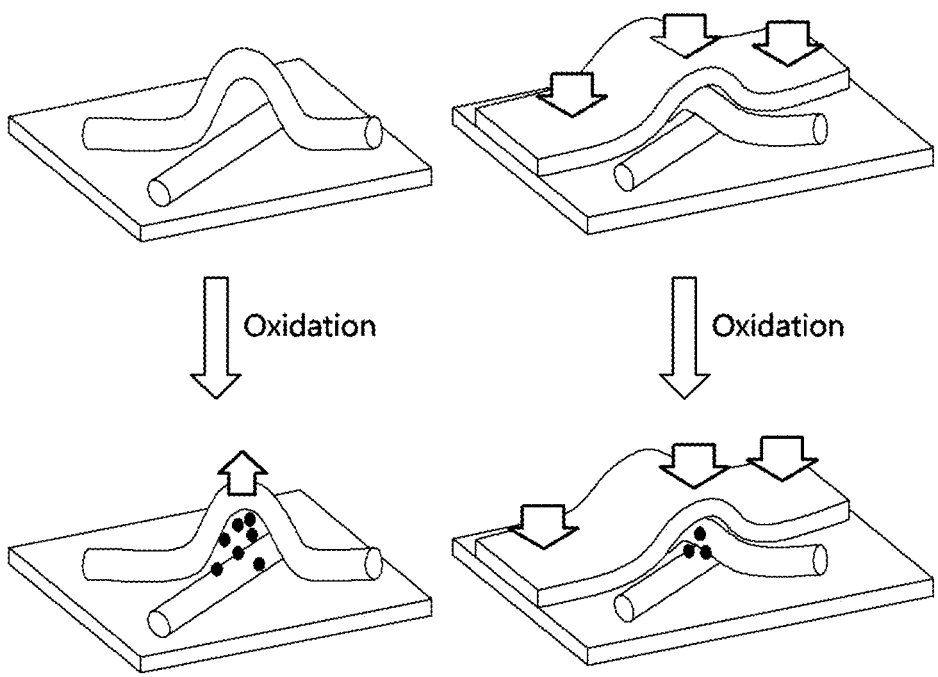
[FIG. 11]
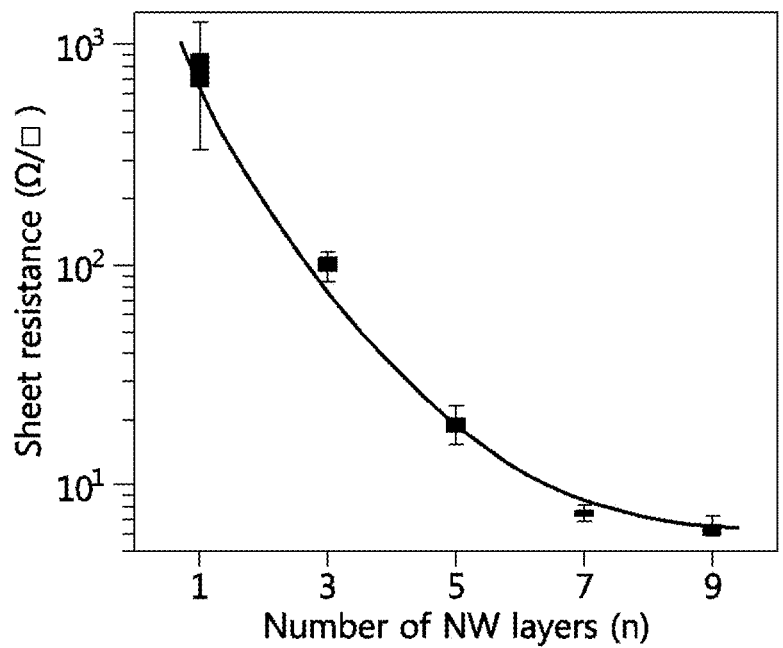

[FIG. 12]
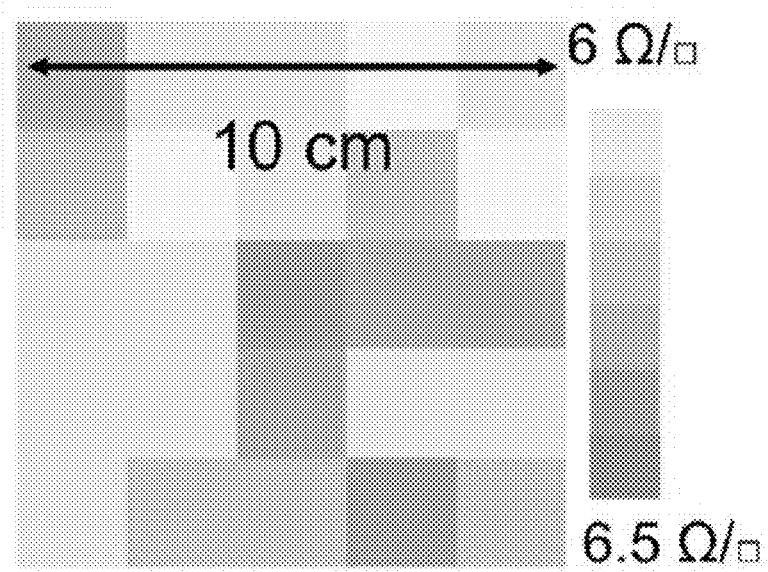
[FIG. 13]
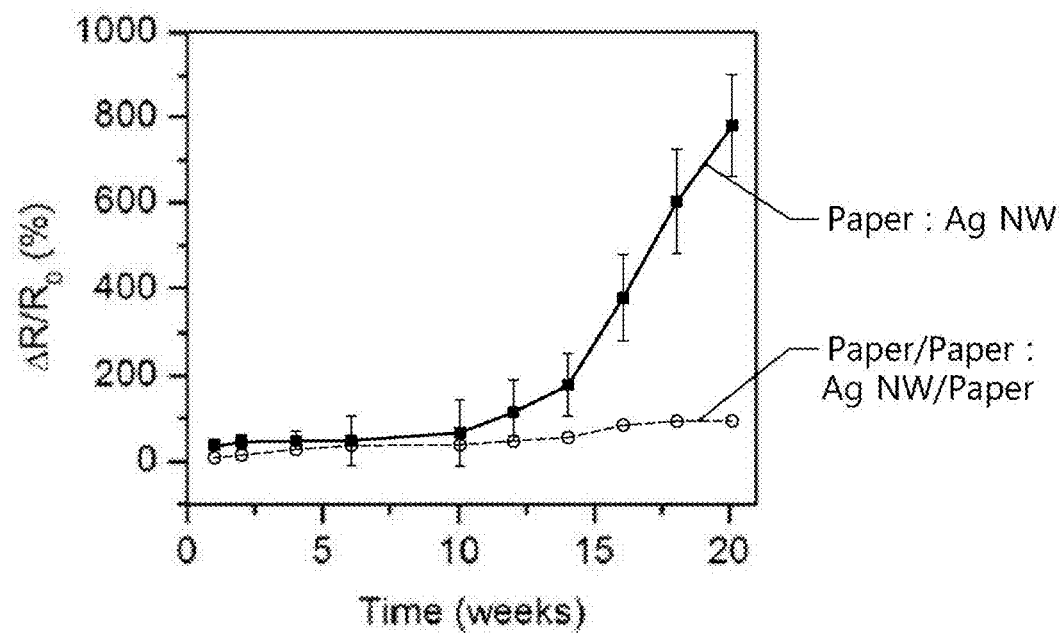

【FIG. 14】
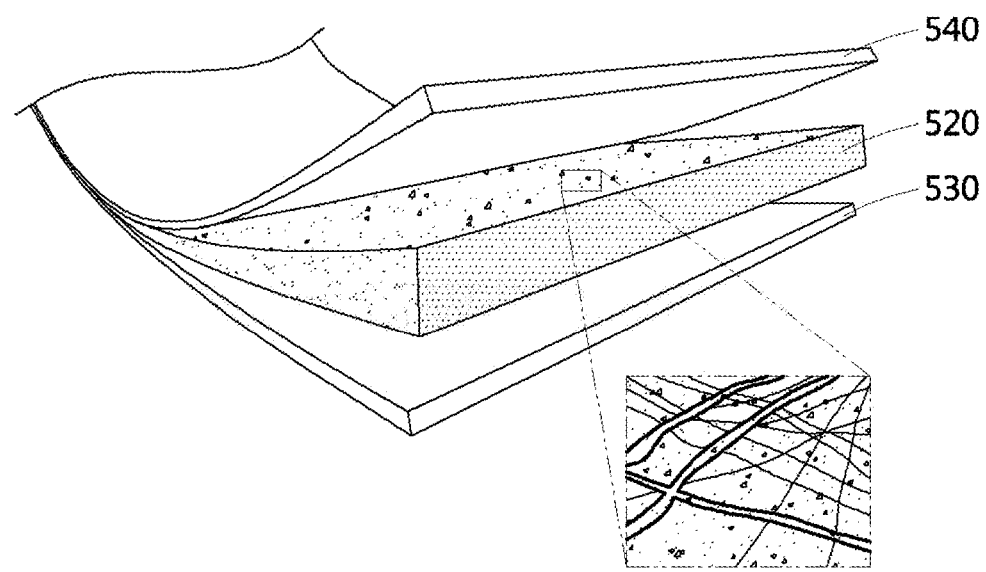
【FIG. 15】
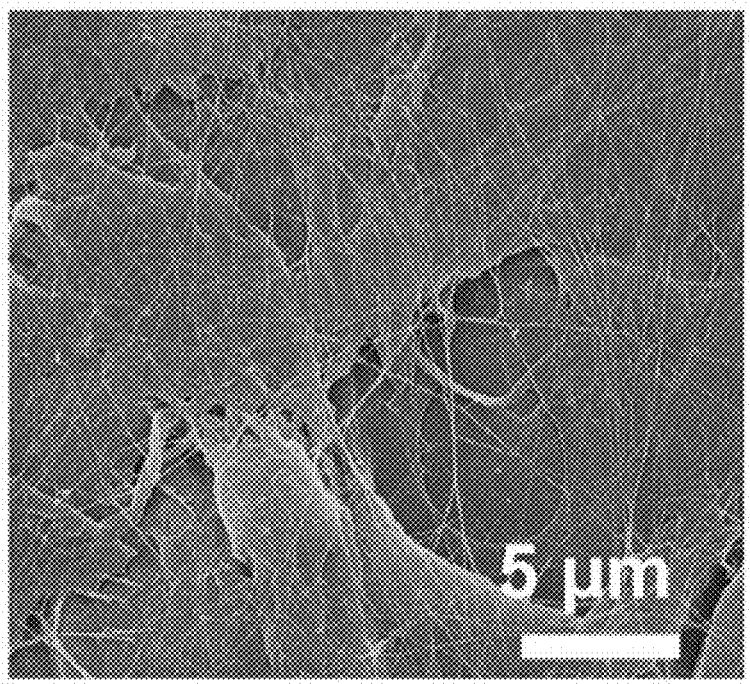

[FIG. 16]
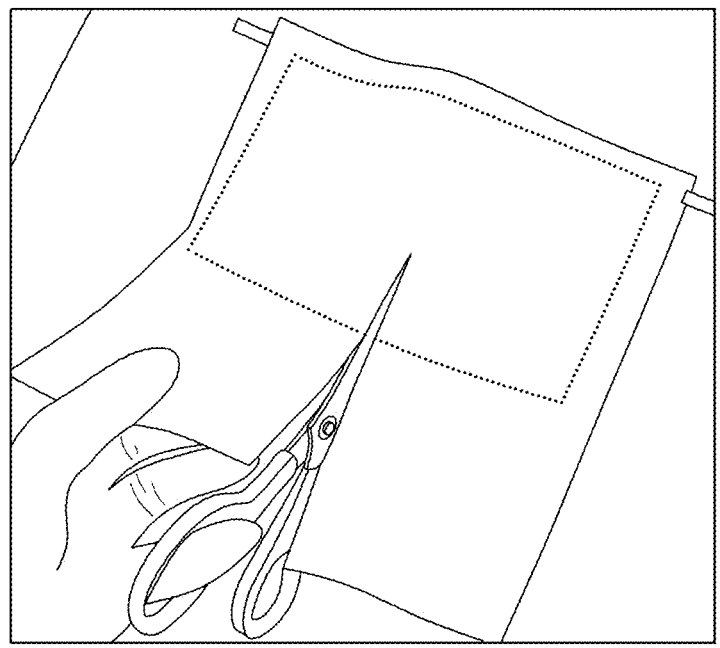
[FIG. 17]
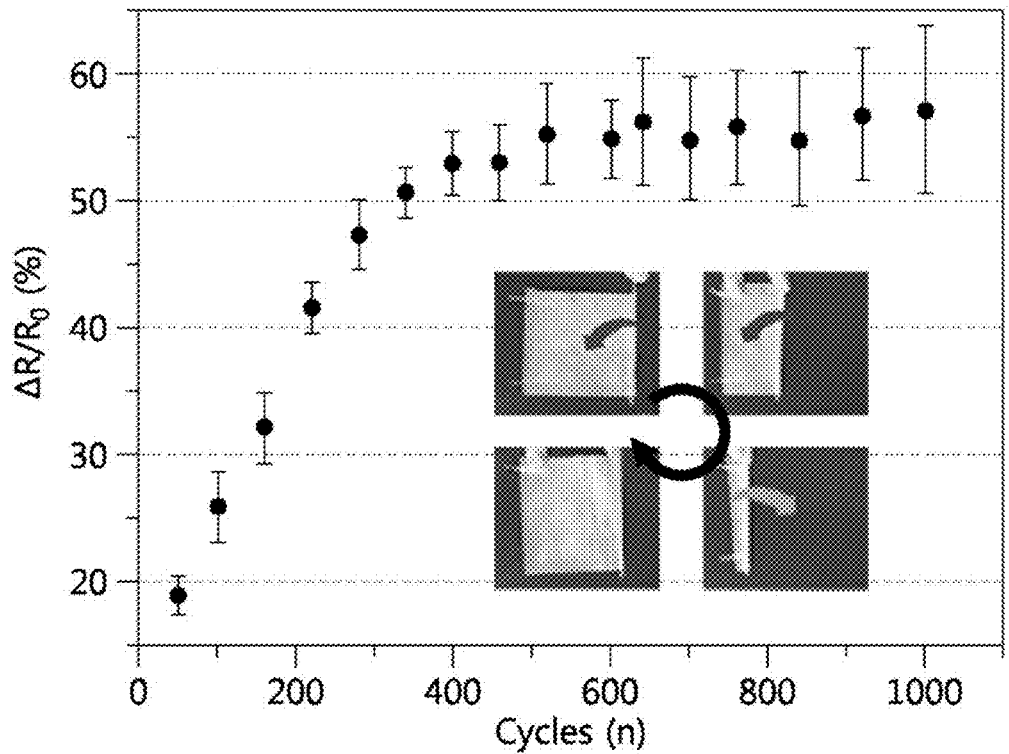

[FIG. 18]
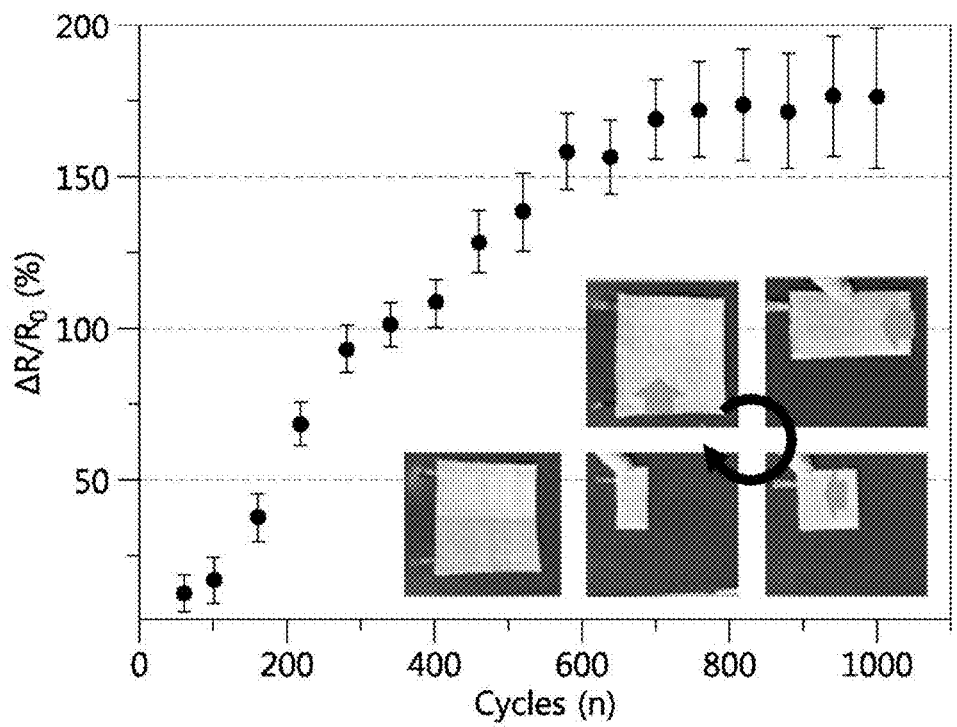
[FIG. 19]
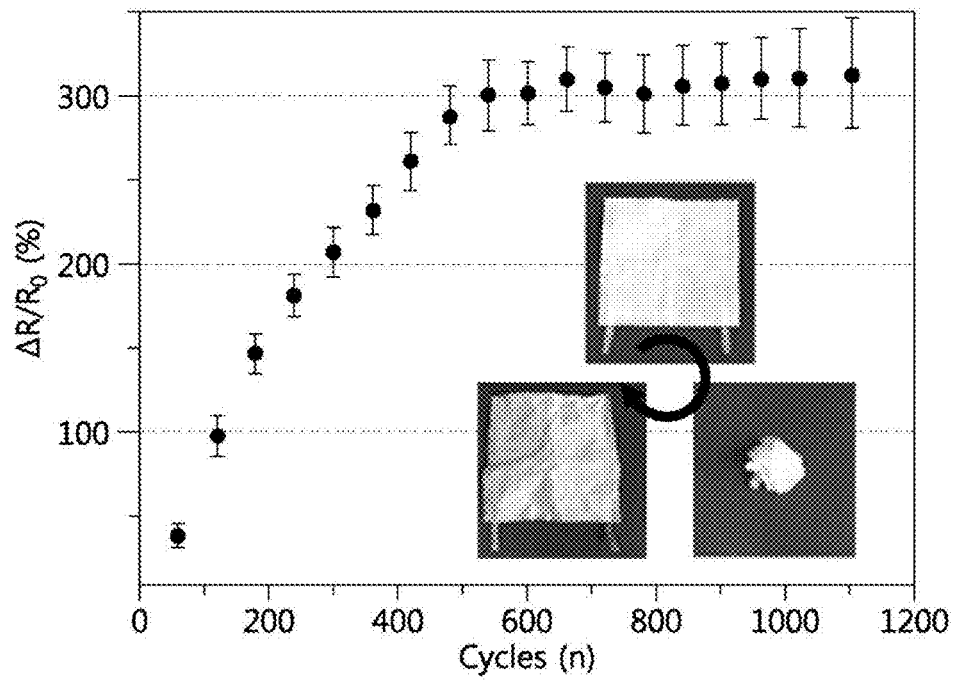

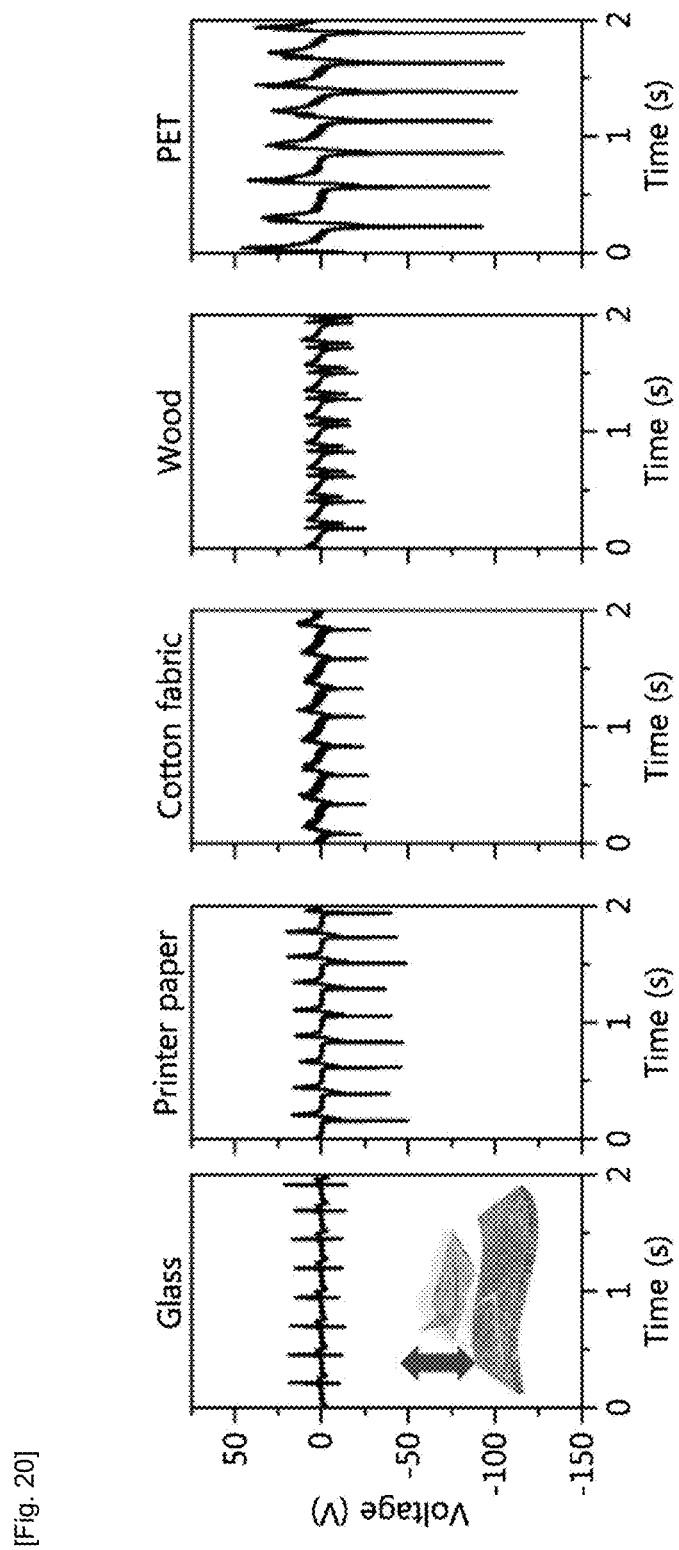
[Fig. 20]

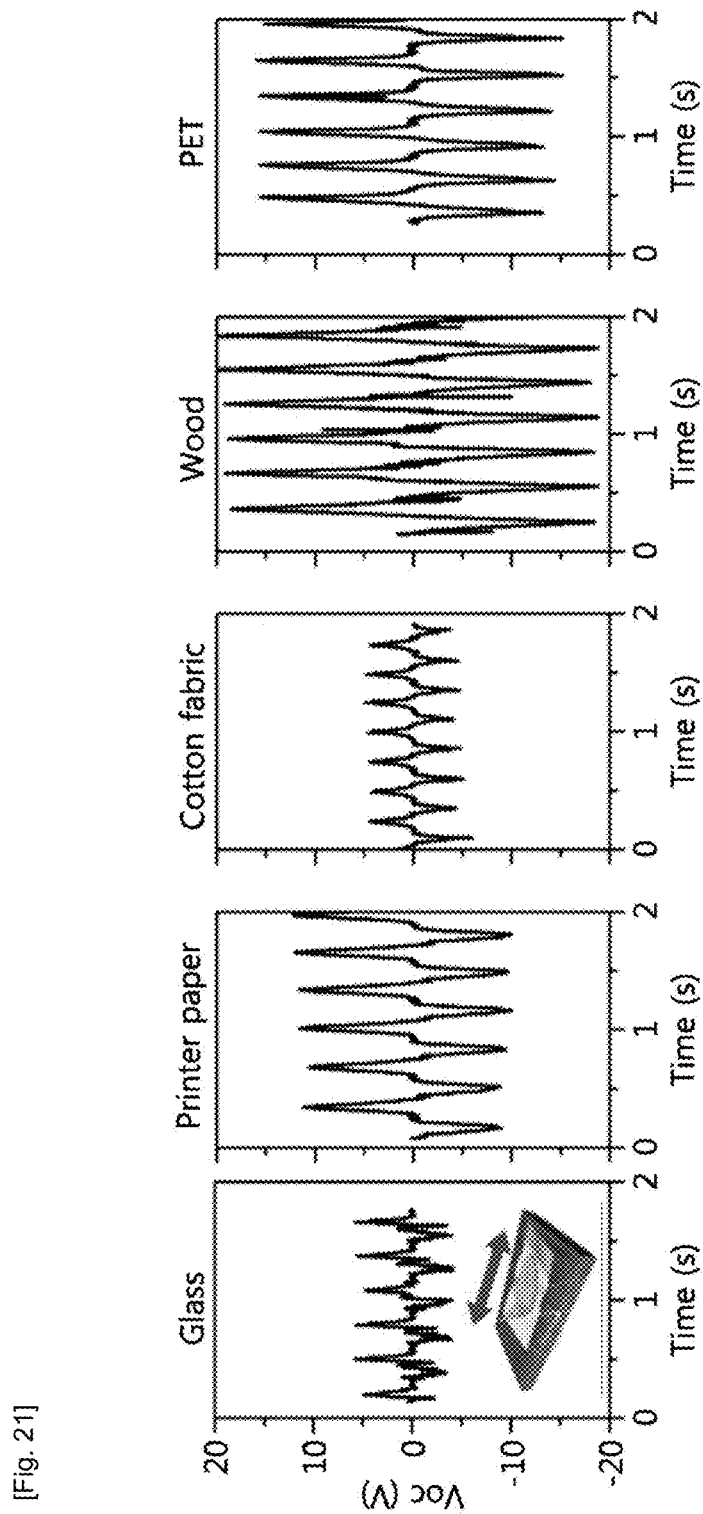
[Fig. 21]

【FIG. 22】
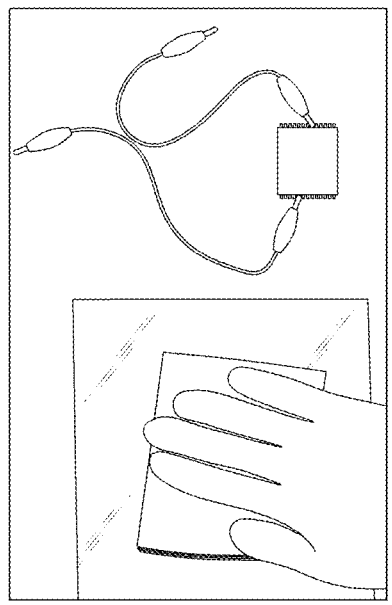
【FIG. 23】
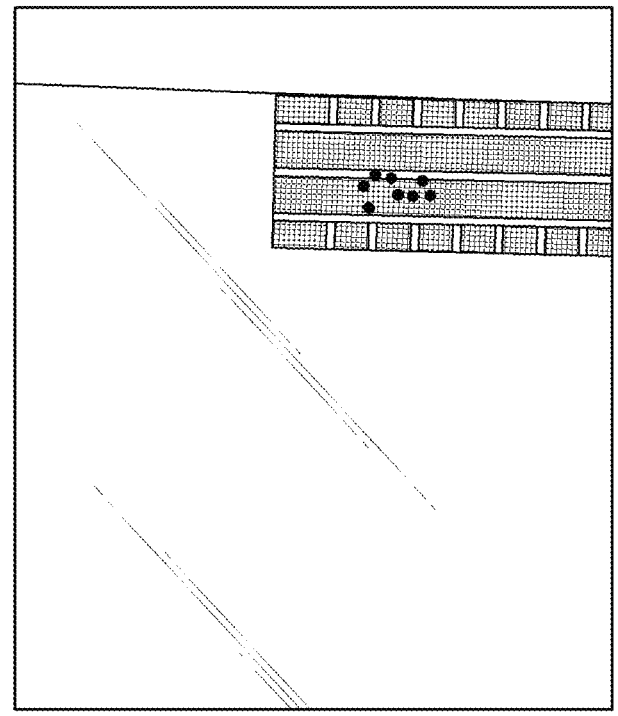

[FIG. 24]
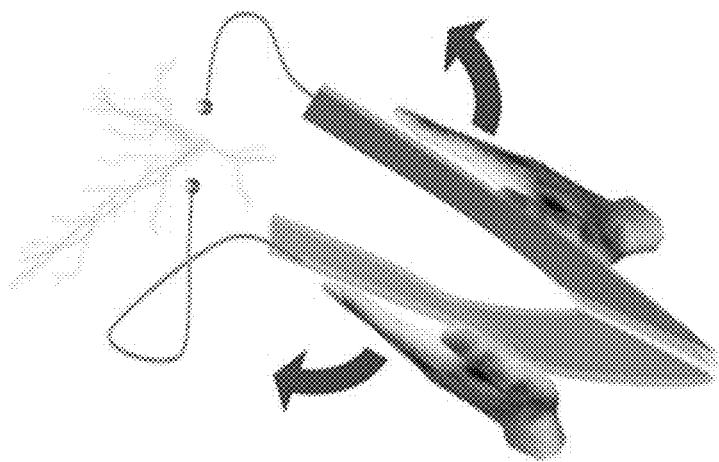
[FIG. 25]
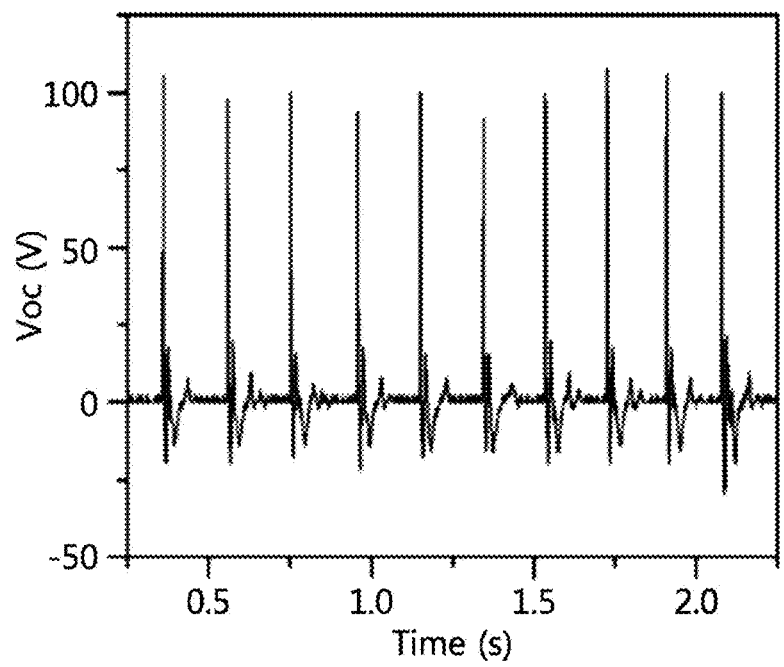

[FIG. 26]
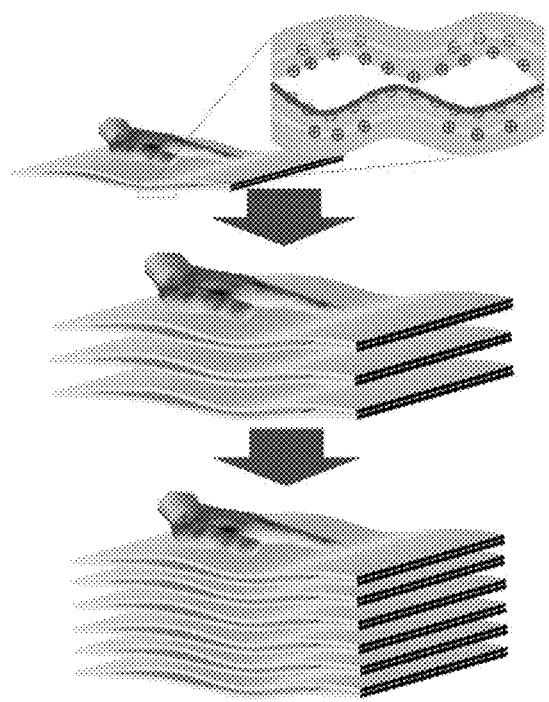
[FIG. 27]
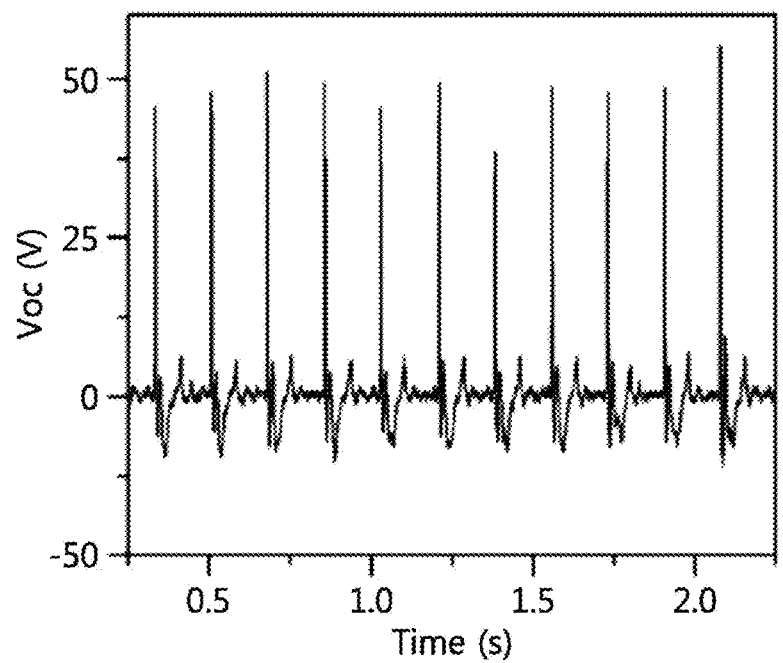

[FIG. 28]
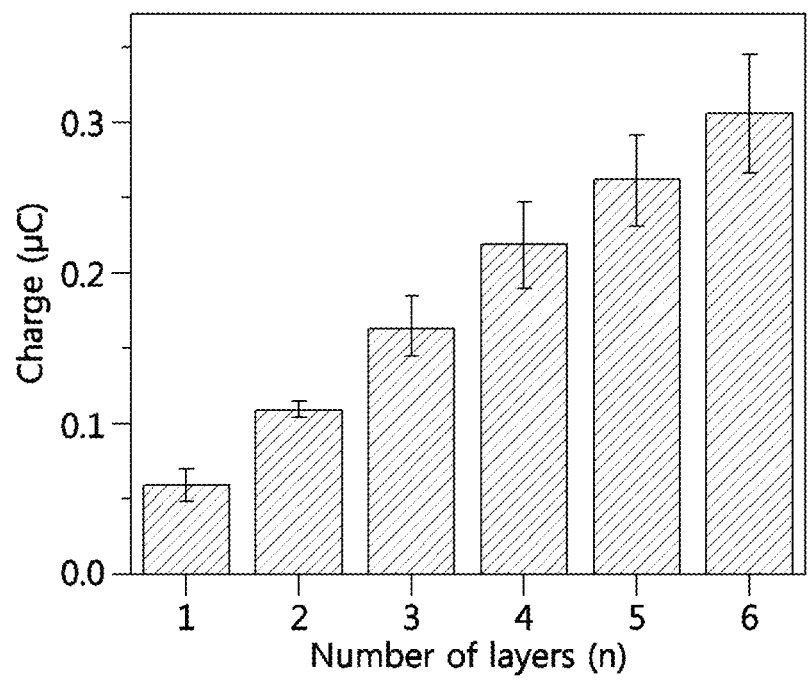
[FIG. 29]
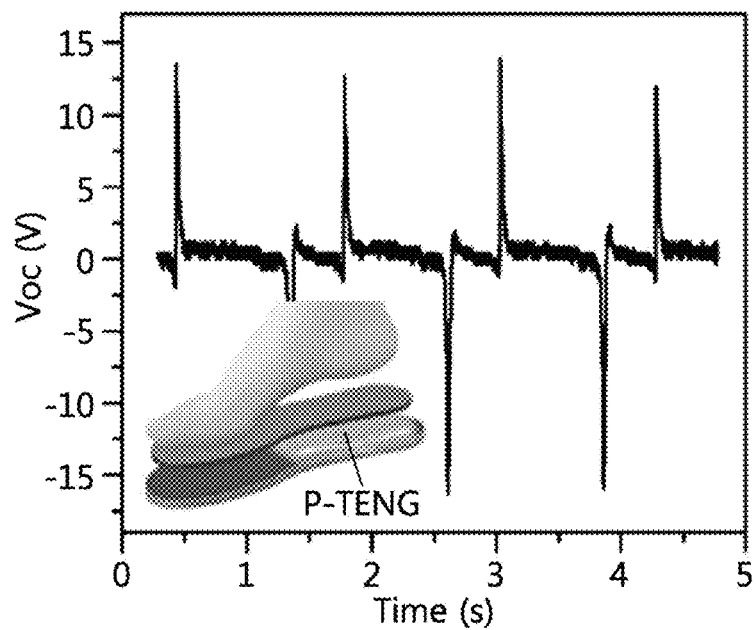

[FIG. 30]
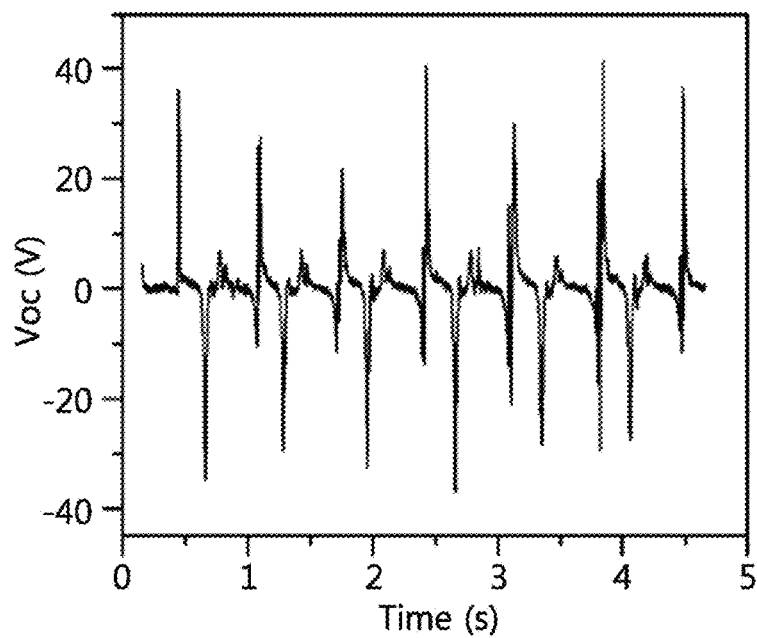
[FIG. 31]
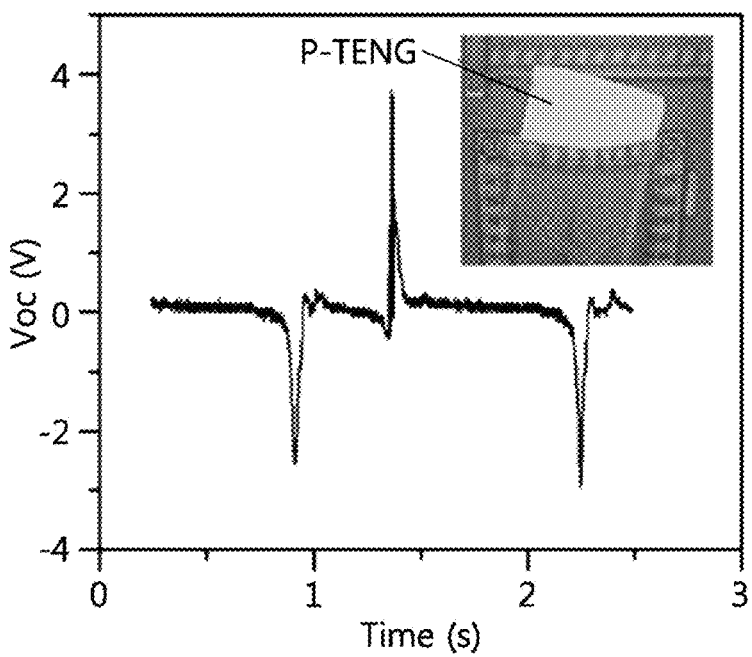

【FIG. 32】
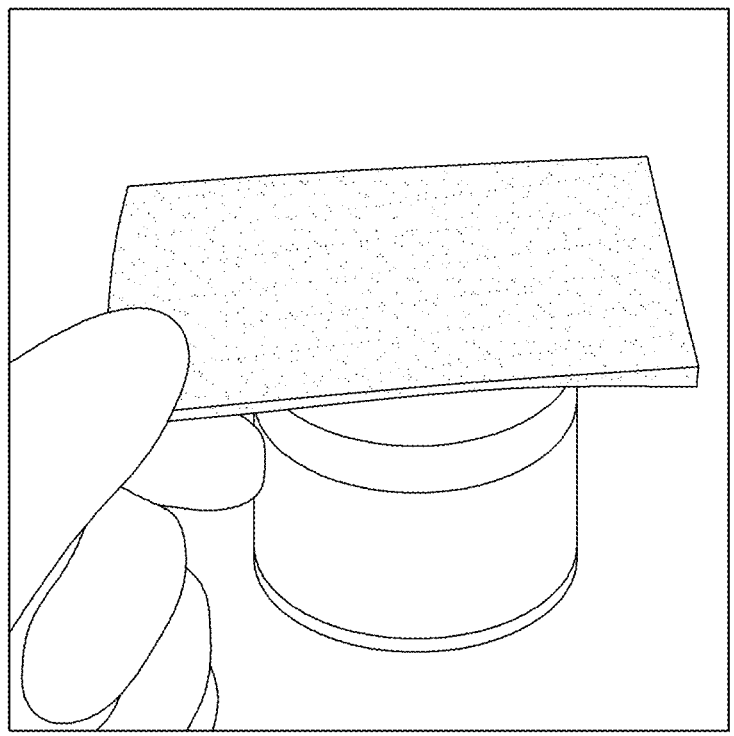
【FIG. 33】
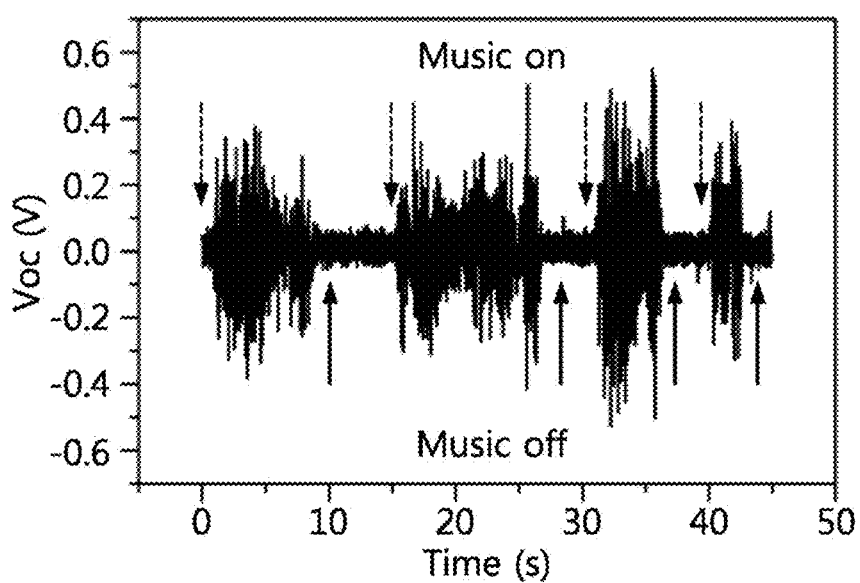

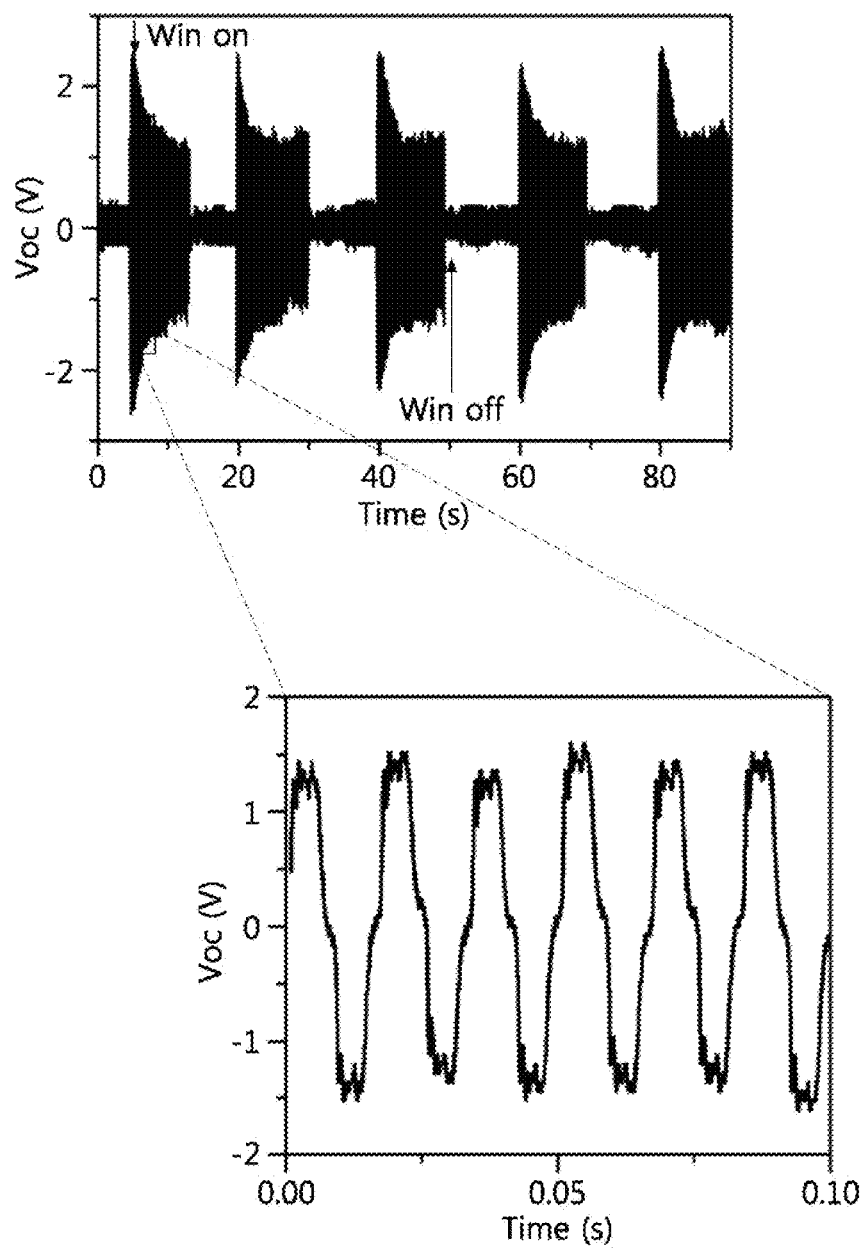
[FIG. 34]

[FIG. 35]
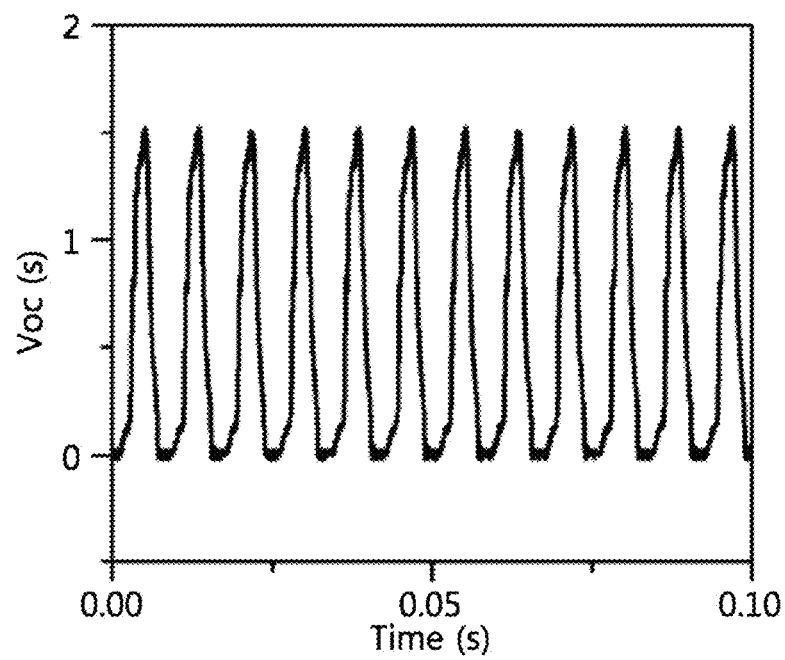
[FIG. 36]
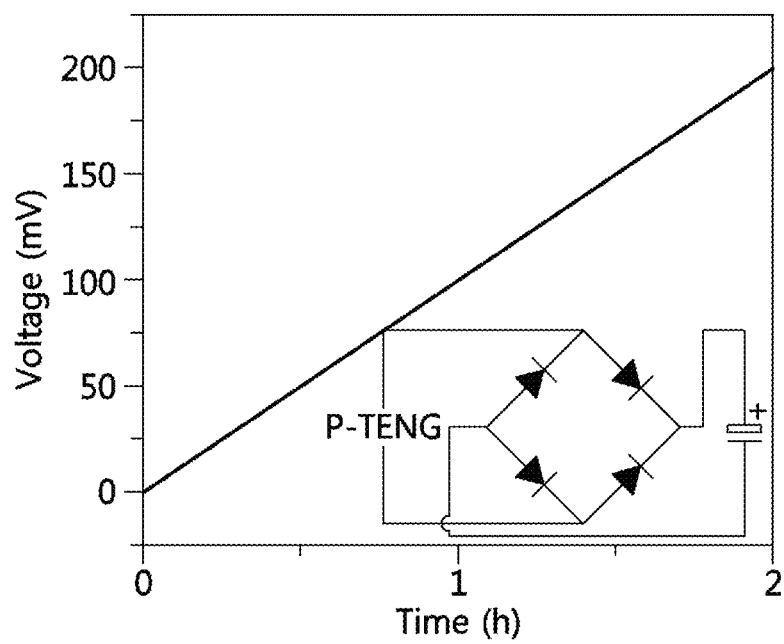

PAPER-BASED TRIBOELECTRIC NANOGENERATOR AND METHOD OF MANUFACTURING THE SAME

CROSS-REFERENCE TO RELATED APPLICATION

This application claims priority to Korean Patent Application No. 10-2018-0029255, filed on Mar. 13, 2018 in the Korean Intellectual Property Office, the disclosure of which is incorporated herein by reference.

BACKGROUND OF THE DISCLOSURE

Field of the Disclosure

The present disclosure relates to a paper-based triboelectric nanogenerator and a method of manufacturing the same. More specifically, the present disclosure relates to a paper-based triboelectric nanogenerator that generates triboelectricity through generation of an electrostatic charge due to difference in charge polarity and to a method of manufacturing the same.

Description of the Related Art

Most products or devices used in domestic and industrial fields are powered by electricity. As society becomes more industrialized, there is a growing demand for devices (or products) that use electricity as a power source.

Accordingly, investment in various power generation facilities such as thermal power generation using fossil energy and nuclear power generation using nuclear fusion or nuclear fission is continuously increasing. In recent years, due to exhaustion of energy resources, investment in and development of various alternative power generation facilities such as solar power generation, wind power generation, and tidal power generation are being actively carried out.

In particular, application of the concept of energy harvesting has led to active research on a system for recovering energy that is abandoned in everyday life. As a specific example, a technique for capturing electrons generated when two different objects are rubbed (for example, a method of harvesting a small amount of electricity from human motion) is being studied.

Triboelectric nanogenerators (TENGs) that convert mechanical energy into electrical energy have advantages such as high energy conversion efficiency, low manufacturing cost, and a simple and bendable structure, and may also be manufactured using various materials. Therefore, research and development of triboelectric nanogenerators are actively underway.

In recent years, paper-based energy harvesting devices using nanomaterials have been developed. One of the most important considerations in developing these paper-based generators is to place highly conductive electrodes on flexible paper. For example, a metal film-coated/paper-based triboelectric nanogenerator capable of converting a small amount of mechanical energy into electrical energy has been reported.

In addition, an ITO film, a Cu film, and an Al film may be used as additional materials for forming conductive paper for electrode formation of a paper-based triboelectric nanogenerator. Paper-based triboelectric nanogenerators using these films are also being developed.

Although some types of paper-based triboelectric nanogenerators have been successfully demonstrated, there is a need for improved performance of paper-based generators for successful application.

When hard paper, paper cards, and ITO film-coated paper are used as a substrate, the flexibility of a nanogenerator may be poor, and the conductivity of such conductive paper may be drastically reduced when subjected to repeated mechanical deformation.

RELATED DOCUMENTS

Patent Documents

Korean Patent No. 10-1580409, "TRANSPARENT AND FLEXIBLE ENERGY HARVESTING DEVICE AND METHOD OF MANUFACTURING THE SAME"

Korean Patent Application Publication No. 10-2017-0002424, "FRICTION-TYPE NANOGENERATOR FOR COLLECTING MECHANICAL ENERGY OF LIQUID AND METHOD OF GENERATING MECHANICAL ENERGY OF LIQUID"

Korean Patent Application Publication No. 10-2015-0027415, "FABRIC-BASED ENERGY GENERATOR"

Non-Patent Documents

Changsheng Wu et al., Paper-Based Triboelectric Nanogenerators Made of Stretchable Interlocking Kirigami Patterns, 2016

Limin Zhang et al., Transparent Paper-Based Triboelectric Nanogenerator as Page Mark and Anti-Theft Sensor, 2014

Sihong Wang et al., Freestanding Triboelectric-Layer-Based Nanogenerators for Harvesting Energy from a Moving Object or Human Motion in Contact and Non-contact Modes, 2014

SUMMARY OF THE DISCLOSURE

Therefore, the present disclosure has been made in view of the above problems, and it is an object of the present disclosure to provide a paper-based triboelectric nanogenerator capable of collecting energy by operating in various operation modes and a method of manufacturing the same.

It is another object of the present disclosure to provide a paper-based triboelectric nanogenerator that has a high degree of flexibility so that electrical characteristics thereof may be maintained even when mechanical deformation is repeatedly applied and that may normally operate even when the shape or size thereof is freely deformed and a method of manufacturing the same.

It is yet another object of the present disclosure to provide a paper-based triboelectric nanogenerator capable of being manufactured through simple and inexpensive processes and a method of manufacturing the same.

In accordance with the present disclosure, the above and other objects can be accomplished by the provision of a paper-based triboelectric nanogenerator including a sandwich structure including a first paper, conductive papers formed on the first paper and each including an electrode composed of a mesh-type conductive nanomaterial, and a second paper formed on the conductive papers; and a polymer film formed in a selective area on the second paper, wherein the number of the conductive papers formed on the first paper is two; the two conductive papers are formed so as to be spaced apart from each other in the horizontal direction; and the polymer film formed in the selective area is formed only in the upper area of one of the two conductive papers.

The paper-based triboelectric nanogenerator may include a first surface area in which the polymer film is selectively formed on the second paper and a second surface area in which the second paper is exposed, and may generate triboelectricity through generation of an electrostatic charge due to difference in charge polarity between the first and second surface areas.

The paper-based triboelectric nanogenerator may generate triboelectricity through physical pressure between the first and second surface areas and a target object.

The physical pressure of the paper-based triboelectric nanogenerator may be pressure applied between the first and second surface areas and the target object by vertical motion.

The physical pressure of the paper-based triboelectric nanogenerator may be pressure applied between the first and second surface areas and the target object by horizontal motion in a state wherein the first and second surface areas and the target object are in contact with each other.

In the paper-based triboelectric nanogenerator, a folding portion may be located between the first and second electrodes formed so as to be spaced apart from each other, and self-contact and separation between the first and second surfaces may be repeated by folding at the folding portion to generate triboelectricity.

In the paper-based triboelectric nanogenerator, a folding portion may be located between the first and second electrodes formed so as to be spaced apart from each other. When the first and second surfaces are in contact with each other by folding at the folding portion, physical pressure may be applied from the outside to generate triboelectricity.

The mesh-type conductive nanomaterial forming the conductive paper may include at least one of metal nanowires, carbon nanotubes, graphene, and conductive nanopolymers.

The polymer film may include at least one of polyvinyl chloride (PVC), polyethyleneterephthalate (PET), polyester (PE), polytetrafluoroethylene (PTFE), polydimethylsiloxane (PDMS), Kapton, polyimide (PI), nylon, polyvinyl alcohol (PVA), polyisobutylene, polyurethane elastic sponges, polyvinyl butyral, polychloroprene, natural rubber, polyacrylonitrile, polydiphenolcarbonate, polyether chloride, polyvinylidene chloride, polystyrene, polyethylene, and polypropylene (PP).

In accordance with an aspect of the present disclosure, the above and other objects can be accomplished by the provision of a method of manufacturing a paper-based triboelectric nanogenerator according to an embodiment of the present disclosure including a step of preparing a conductive paper; a step of attaching two conductive papers on a first paper so as to be spaced apart from each other; a step of attaching a second paper on the conductive papers to form a sandwich structure; and a step of forming a polymer film on the sandwich structure.

The step of preparing may include a step of forming an electrode composed of a mesh-type conductive nanomaterial on paper using at least one process of dip-coating, screen-printing, spray-coating, and spin-coating.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates a paper-based triboelectric nanogenerator according to an embodiment of the present disclosure;

FIGS. 2 to 4 illustrate charge behavior depending on the position of a target object in the triboelectric series when a paper-based triboelectric nanogenerator according to an embodiment of the present disclosure is in contact with the target object;

FIGS. 5 to 7 illustrate the operation modes of a paper-based triboelectric nanogenerator according to an embodiment of the present disclosure;

FIG. 8 illustrates a process of manufacturing a conductive paper included in a paper-based triboelectric nanogenerator according to an embodiment of the present disclosure;

FIGS. 9 and 10 illustrate a method of manufacturing the sandwich structure of a paper-based triboelectric nanogenerator according to an embodiment of the present disclosure;

FIGS. 11 to 13 show the results of evaluation of the characteristics of a conductive paper included in a paper-based triboelectric nanogenerator according to an embodiment of the present disclosure;

FIG. 14 illustrates the surface structure of a conductive paper included in a paper-based triboelectric nanogenerator according to an embodiment of the present disclosure;

FIG. 15 shows an image of a conductive paper included in a paper-based triboelectric nanogenerator according to an embodiment of the present disclosure taken using a scanning electron microscope (SEM);

FIG. 16 is an image showing cutting of a paper-based triboelectric nanogenerator according to an embodiment of the present disclosure;

FIGS. 17 to 19 are graphs and images showing the operation of a paper-based triboelectric nanogenerator according to an embodiment of the present disclosure when physical transformation is applied to the paper-based triboelectric nanogenerator;

FIG. 20 includes graphs showing the open-circuit voltages (Voc) of a paper-based triboelectric nanogenerator according to an embodiment of the present disclosure when the paper-based triboelectric nanogenerator operates in a vertical contact-separation operation mode;

FIG. 21 includes graphs showing the open-circuit voltages (Voc) of a paper-based triboelectric nanogenerator according to an embodiment of the present disclosure when the paper-based triboelectric nanogenerator operates in a lateral-sliding operation mode;

FIGS. 22 and 23 are images showing operation of a paper-based triboelectric nanogenerator according to an embodiment of the present disclosure in a lateral-sliding operation mode (LS);

FIG. 24 illustrates a self-contact operation mode in which triboelectricity is generated by applying external pressure to a paper-based triboelectric nanogenerator according to an embodiment of the present disclosure when the paper-based triboelectric nanogenerator is folded and contacts itself;

FIG. 25 is a graph showing the open-circuit voltages (Voc) of a paper-based triboelectric nanogenerator according to an embodiment of the present disclosure when the paper-based triboelectric nanogenerator operates in a self-contact operation mode;

FIGS. 26 to 28 show the shape and data values when a paper-based triboelectric nanogenerator according to an embodiment of the present disclosure is vertically laminated;

FIGS. 29 and 30 show the shape and data values when a paper-based triboelectric nanogenerator according to an embodiment of the present disclosure of a self-contact operation mode is applied to the inside of a shoe;

FIG. 31 is a graph showing the open-circuit voltages (Voc) of a paper-based triboelectric nanogenerator according to an embodiment of the present disclosure when the human body moves with the paper-based triboelectric nanogenerator of a self-contact operation mode in a garment pocket;

FIGS. 32 and 33 show the shape and data values when a paper-based triboelectric nanogenerator according to an embodiment of the present disclosure of a self-contact operation mode is placed on a speaker; and FIGS. 34 to 36 show data when a paper-based triboelectric nanogenerator according to an embodiment of the present disclosure is applied to wind energy harvesting.

DETAILED DESCRIPTION OF THE DISCLOSURE

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the disclosure and the appended claims, the singular form "a" or "an" is intended to include the plural forms as well, unless context clearly indicates otherwise.

Although terms used in the specification are selected from terms generally used in related technical fields, other terms may be used according to technical development and/or due to change, practices, priorities of technicians, etc. Therefore, it should not be understood that terms used below limit the technical spirit of the present disclosure, and it should be understood that the terms are exemplified to describe embodiments of the present disclosure.

Also, some of the terms used herein may be arbitrarily chosen by the present applicant. In this case, these terms are defined in detail below. Accordingly, the specific terms used herein should be understood based on the unique meanings thereof and the whole context of the present disclosure.

Meanwhile, terms such as "first" and "second" are used herein merely to describe a variety of constituent elements, but the constituent elements are not limited by the terms. The terms are used only for the purpose of distinguishing one constituent element from another constituent element.

In addition, when an element such as a layer, a film, a region, and a constituent is referred to as being "on" another element, the element can be directly on another element or an intervening element can be present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, in the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

Hereinafter, embodiments of the present disclosure will be described in detail with reference to the accompanying drawings.

FIG. 1 illustrates a paper-based triboelectric nanogenerator according to an embodiment of the present disclosure.

Referring to FIG. 1, a paper-based triboelectric nanogenerator 100 according to an embodiment of the present disclosure includes a sandwich structure 200 and a polymer film 300.

The sandwich structure 200 includes first and second conductive papers 220 and 230 formed on a first paper 210 and each including an electrode composed of a mesh-type conductive nanomaterial and a second paper 240 formed on the conductive papers.

A first external connection electrode 221 connected to the outside of the paper-based triboelectric nanogenerator 100 may be attached to the first conductive paper 220, and a second external connection electrode 231 connected to the outside of the paper-based triboelectric nanogenerator 100 may be attached to the second conductive paper 230.

In the paper-based triboelectric nanogenerator 100 according to an embodiment of the present disclosure, the first and second conductive papers 220 and 230 may be formed on the first paper so as to be spaced apart from each other.

The mesh-type conductive nanomaterial forming the first and second conductive papers 220 and 230 may include at least one of metal nanowires, carbon nanotubes, graphene, and conductive nanopolymers.

The polymer film 300 formed on the second paper 240 of the sandwich structure 200 may be selectively formed in the upper area of any one of the first and second conductive papers 220 and 230.

The polymer film 300 may include at least one of polyvinyl chloride (PVC), polyethyleneterephthalate (PET), polyester (PE), polytetrafluoroethylene (PTFE), polydimethylsiloxane (PDMS), Kapton, polyimide (PI), nylon, polyvinyl alcohol (PVA), polyisobutylene, polyurethane elastic sponges, polyvinyl butyral, polychloroprene, natural rubber, polyacrylonitrile, polydiphenolcarbonate, polyether chloride, polyvinylidene chloride, polystyrene, polyethylene, and polypropylene (PP).

The paper-based triboelectric nanogenerator 100 according to an embodiment of the present disclosure has a first surface area 250 in which the second paper 240 of the sandwich structure 200 is exposed and a second surface area 310 in which the polymer film 300 is exposed.

In the paper-based triboelectric nanogenerator 100 according to an embodiment of the present disclosure, since the first surface area has an electronegativity close to a positive value in the triboelectric series and the second surface area 310 has an electronegativity close to a negative value, difference in charge polarity may occur due to different electronegativities between the surface areas.

Therefore, the paper-based triboelectric nanogenerator 100 according to an embodiment of the present disclosure may generate triboelectricity through generation of an electrostatic charge due to difference in charge polarities between the first and second surface areas 250 and 310.

The paper-based triboelectric nanogenerator 100 according to an embodiment of the present disclosure may generate triboelectricity through generation of an electrostatic charge due to difference in the number of charges between the first and second surface areas 250 and 310.

The paper-based triboelectric nanogenerator 100 according to an embodiment of the present disclosure may have three types of operation modes.

For example, the paper-based triboelectric nanogenerator 100 according to an embodiment of the present disclosure may operate in at least one of a vertical contact-separation operation mode (VCS), a lateral-sliding operation mode (LS), and a self-contact operation mode.

In the case of the vertical contact-separation operation mode, external pressure in the vertical direction is applied to a target object, and contact and separation between the nanogenerator 100 and the target object arranged vertically to each other are repeated to generate triboelectricity.

In addition, in the case of the lateral-sliding operation mode, triboelectricity may be generated by horizontally moving the paper-based triboelectric nanogenerator 100 while the nanogenerator 100 and a target object are in contact with each other.

In addition, in the case of the self-contact operation mode, the paper-based triboelectric nanogenerator 100 may be folded with respect to the boundary between the first and second surface areas 250 and 310, and contact and separation by external force may be repeatedly performed in the paper-based triboelectric nanogenerator 100 itself to generate triboelectricity.

FIGS. 2 to 4 illustrate charge behavior depending on the position of a target object in the triboelectric series when a paper-based triboelectric nanogenerator according to an embodiment of the present disclosure is in contact with the target object.

In the paper-based triboelectric nanogenerator 100 according to an embodiment of the present disclosure, since the first surface area 250 where the second paper 240 is exposed and the second surface area 310 where the polymer film 300 is exposed are located opposite to each other, even when a target object 400 is any material in the triboelectric series, difference in charge polarities between the first and second surface areas 250 and 310 may occur, thereby generating triboelectricity.

More specifically, the charge behavior of the paper-based triboelectric nanogenerator according to FIGS. 2 to 4 may be the same as the charge behavior of a paper-based triboelectric nanogenerator that operates in a vertical contact-separation operation mode or a lateral-sliding operation mode.

Referring to FIG. 2, charge distribution for a case wherein the first and second surface areas 250 and 310 of the paper-based triboelectric nanogenerator 100 according to an embodiment of the present disclosure are in contact with the target object 400 having a medium value (i.e., medium ability) in the triboelectric series is shown.

As shown in FIG. 2, the first surface area 250 of the triboelectric nanogenerator 100 may have a positive charge, the surface of the target object 400 in contact with the first surface area 250 may have a negative charge, the second surface area 310 of the triboelectric nanogenerator 100 may have a negative charge, and the surface of the target object 400 in contact with the second surface area 310 may have a positive charge.

Referring to FIG. 3, charge distribution for a case wherein the first and second surface areas 250 and 310 of the paper-based triboelectric nanogenerator 100 according to an embodiment of the present disclosure are in contact with the target object 400 having strong ability to lose electrons is shown.

As shown in FIG. 3, since the target object 400 shown in FIG. 3 has having strong ability to lose electrons, the second surface area 310 of the triboelectric nanogenerator 100 may have a negative charge, and the surface of the target object 400 in contact with the second surface area 310 may have a strong positive charge.

Referring to FIG. 4, charge distribution for a case wherein the first and second surface areas 250 and 310 of the paper-based triboelectric nanogenerator 100 according to an embodiment of the present disclosure are in contact with the target object 400 having strong ability to gain electrons is shown.

As shown in FIG. 4, since the target object 400 shown in FIG. 4 has strong ability to gain electrons, the first surface area 250 of the triboelectric nanogenerator 100 may have a positive charge, and the surface of the target object 400 in contact with the first surface area 250 may have a strong negative charge.

FIGS. 5 to 7 illustrate the operation modes of a paper-based triboelectric nanogenerator according to an embodiment of the present disclosure.

Referring to FIG. 5, the paper-based triboelectric nanogenerator 100 according to an embodiment of the present disclosure may operate in a vertical contact-separation operation mode. That is, external pressure in the vertical direction is applied to the target object 400, and contact and separation between the nanogenerator 100 and the target object arranged vertically to each other are repeated to generate triboelectricity.

In the vertical contact-separation operation mode, when the paper-based triboelectric nanogenerator 100 according to an embodiment of the present disclosure in contact with the target object begins to move away from the target object in the vertical direction, potential difference is generated between the first and second conductive papers 220 and 230, and as a result, triboelectricity is generated. Then, electrons flow through an external circuit, so that the potential difference is balanced and the electrostatic equilibrium is established.

Next, when the paper-based triboelectric nanogenerator 100 contacts the target object again, the electrostatic equilibrium is broken and electrons flow through the external circuit, resulting in triboelectricity generation.

Referring to FIG. 6, the paper-based triboelectric nanogenerator 100 according to an embodiment of the present disclosure may operate in a lateral-sliding operation mode. That is, triboelectricity is generated by allowing the paper-based triboelectric nanogenerator 100 to move in the horizontal direction in contact with the target object 400.

In the lateral-sliding operation mode, when the paper-based triboelectric nanogenerator 100 according to an embodiment of the present disclosure moves in the horizontal direction in contact with the target object, the triboelectric charge between the first and second surface areas 250 and 310 may be changed, and thus potential difference may be generated between the first and second conductive papers 220 and 230 to generate an electron flow. Consequently, triboelectricity may be generated.

Referring to FIG. 7, the paper-based triboelectric nanogenerator 100 according to an embodiment of the present disclosure may operate in a self-contact operation mode. That is, the paper-based triboelectric nanogenerator 100 is folded with respect to the boundary between the first and second surface areas 250 and 310, and contact and separation by external force are repeatedly performed in the nanogenerator 100 itself to generate triboelectricity.

In the case of the paper-based triboelectric nanogenerator 100 according to an embodiment of the present disclosure that operates in the self-contact operation mode, similar to the electricity generation mechanism of the vertical contact-separation operation mode described above, when the first and second surface areas 250 and 310 of the paper-based triboelectric nanogenerator 100 in a self-contacting state are separated and begin to move away from each other in the vertical direction, potential difference is generated between the first and second conductive papers 220 and 230 to generate triboelectricity. Then, electrons flow through an external circuit, so that the potential difference is balanced and electrostatic equilibrium is established.

Next, the first and second surface areas 250 and 310 of the paper-based triboelectric nanogenerator 100 are in a self-contacting state again, the electrostatic equilibrium is broken and electrons flow through the external circuit, resulting in triboelectricity generation.

A folding portion for folding the paper-based triboelectric nanogenerator 100 according to an embodiment of the present disclosure may be located between the first and second conductive papers 220 and 230 formed at the same height on the first paper and spaced apart from each other and may be located in a region where a conductive paper is absent.

FIG. 8 illustrates a process of manufacturing a conductive paper included in a paper-based triboelectric nanogenerator according to an embodiment of the present disclosure.

Referring to FIG. 8, a conductive paper 520 of the paper-based triboelectric nanogenerator 100 may be prepared using a commercial paper such as tissue paper as a base paper 510.

According to an embodiment, to prepare the conductive paper 520 of the paper-based triboelectric nanogenerator 100, a suspension 600 is prepared by adding a conductive nanowire to isopropyl alcohol (IPA) in a specific weight ratio, and then the base paper 510 is subjected to a dip-coating process using the suspension to prepare the conductive paper 520.

The conductive paper 520 may be prepared by coating the surface of the base paper 510 with a mesh-type conductive nanomaterial.

Specifically, the conductive nanowire may be added to isopropyl alcohol (IPA) at a concentration of 0.005 wt %, without being limited thereto.

In addition, the conductive paper 520 of the paper-based triboelectric nanogenerator 100 may be prepared through at least one process of screen-printing, spray-coating, and spin-coating using the suspension 600.

FIGS. 9 and 10 illustrate a method of manufacturing the sandwich structure of a paper-based triboelectric nanogenerator according to an embodiment of the present disclosure.

Referring to FIG. 9, to prepare a sandwich structure 500 of the paper-based triboelectric nanogenerator 100 according to an embodiment of the present disclosure, the conductive paper 520 may be attached to a first paper 530 using an adhesive 550 generally used for bonding paper, and a second paper 540 may be attached to the conductive paper 520 using the adhesive 550.

As shown in FIG. 8, the conductive paper 520 may be prepared by dip-coating the base paper 510 with the suspension 600 prepared by adding a conductive nanowire to isopropyl alcohol in a specific weight ratio.

Referring to FIG. 10, as described above, the conductive paper 520 of the paper-based triboelectric nanogenerator 100 according to an embodiment of the present disclosure may be prepared by coating a base paper with a mesh-type conductive nanomaterial. In this case, by attaching the second paper 540, a phenomenon that the nanomaterial crossed in a mesh type is separated due to oxidation or the like may be prevented.

In addition, in the sandwich structure 500 of the paper-based triboelectric nanogenerator 100, attachment of the second paper 540 may prevent the conductive paper 520 from being exposed to the outside. Thus, the second paper 540 may serve to prevent a user from directly contacting the conductive paper 520.

FIGS. 11 to 13 show the results of evaluation of the characteristics of a conductive paper included in a paper-based triboelectric nanogenerator according to an embodiment of the present disclosure.

FIG. 11 is graph showing the sheet resistance of the conductive paper 520 depending on the number of conductive nanowire layers.

Referring to FIG. 11, when the number of conductive nanowire layers is increased, that is, in the case of the conductive paper 520 subjected to the dip-coating process several times, sheet resistance may be decreased.

FIG. 12 shows the results of measuring the electrical conductivity of the prepared conductive paper 520 according to position.

Referring to FIG. 12, 25 positions were selected to test the electrical conductivity of the prepared conductive paper 520, and then the electrical conductivity was measured. As a result, it was confirmed that the conductive paper 520 having uniform electrical conductivity was manufactured.

FIG. 13 is a graph showing the electrical stability of the sandwich structure 500 of the paper-based triboelectric nanogenerator 100 according to an embodiment of the present disclosure depending on the presence or absence of the second paper 540.

Referring to FIG. 13, in the case of a structure in which the second paper 540 is not formed, sheet resistance increases by more than 800% after two weeks from the time of manufacture. On the other hand, in the case of the sandwich structure 500 in which the second paper 540 is formed, sheet resistance slightly (less than 100%) increases even after two weeks from the time of manufacture. These results suggest that the second paper 540 serves to protect the paper-based triboelectric nanogenerator 100.

FIG. 14 illustrates the surface structure of a conductive paper included in a paper-based triboelectric nanogenerator according to an embodiment of the present disclosure.

Referring to FIG. 14, it can be seen that a mesh-type conductive nanomaterial is formed on the surface of the conductive paper 520 disposed between the first and second papers 530 and 540.

FIG. 15 shows an image of a conductive paper included in a paper-based triboelectric nanogenerator according to an embodiment of the present disclosure taken using a scanning electron microscope (SEM).

Referring to FIG. 15, it can be seen that a mesh-type conductive nanomaterial is formed on the base paper as in FIG. 14.

FIG. 16 is an image showing cutting of a paper-based triboelectric nanogenerator according to an embodiment of the present disclosure.

Referring to FIG. 16, in the case of cutting a paper-based triboelectric nanogenerator according to an embodiment of the present disclosure, since the nanogenerator is composed of three layers of paper and a polymer film, the nanogenerator may normally operate when a user cuts the nanogenerator into an arbitrary size and shape within a range that does not destroy the basic structure of the nanogenerator shown in FIG. 1.

FIGS. 17 to 19 are graphs and images showing the operation of a paper-based triboelectric nanogenerator according to an embodiment of the present disclosure when physical transformation is applied to the paper-based triboelectric nanogenerator.

In FIG. 17, structures observed when the paper-based triboelectric nanogenerator 100 according to an embodiment of the present disclosure is curled and the resistance normal distribution of the nanogenerator are shown. One cycle is defined as follows: the paper-based triboelectric nanogenerator 100 according to an embodiment of the present disclosure is curled until the diameter of the cross section becomes 3 mm, and then the curled nanogenerator 100 is allowed to return to the original state thereof. The electrical conductivity was measured at each cycle, and the measured results are shown in FIG. 17.

As shown in FIG. 17, the normal distribution of resistance depending on the number of cycles is shown. Up to about 500 cycles, the normal distribution of resistance increases to 55%. After about 500 cycles, no changes are observed.

In FIG. 18, structures observed when the paper-based triboelectric nanogenerator 100 according to an embodiment of the present disclosure is folded and the resistance normal distribution of the nanogenerator are shown.

Specifically, one cycle is defined as follows: an operation of folding the paper-based triboelectric nanogenerator 100 according to an embodiment of the present disclosure in half and unfolding the folded nanogenerator is repeated four times. The electrical conductivity of the nanogenerator was measured at each cycle, and the results are shown in FIG. 18.

Referring to FIG. 18, up to about 700 cycles, the normal distribution of resistance increases to 170%. After about 700 cycles, no changes are observed.

In FIG. 19, structures observed when the paper-based triboelectric nanogenerator 100 according to an embodiment of the present disclosure is crumpled into a ball shape and the resistance normal distribution of the nanogenerator are shown. One cycle is defined as follows: the paper-based triboelectric nanogenerator 100 according to an embodiment of the present disclosure is crumpled into a ball shape and then returned to the original shape thereof. The electrical conductivity of the nanogenerator was measured at each cycle, and the results are shown in FIG. 19.

As shown in FIG. 19, up to about 500 cycles, the normal distribution of resistance increases to 300%. After about 500 cycles, no changes are observed.

As described above, FIGS. 16 to 19 show that the sheet resistance is kept relatively low even when strong physical strain is applied to the paper-based triboelectric nanogenerator 100 according to an embodiment of the present disclosure.

FIG. 20 includes graphs showing the open-circuit voltages (Voc) of a paper-based triboelectric nanogenerator according to an embodiment of the present disclosure when the paper-based triboelectric nanogenerator operates in a vertical contact-separation operation mode.

FIG. 20 shows the open-circuit voltages (Voc) of the paper-based triboelectric nanogenerator operating in a vertical contact-separation operation mode when the target objects are glass, paper for printing, cotton fabric, wood, and polyethyleneterephthalate (PET). As shown in FIG. 20, the triboelectric nanogenerator 100 operating in a vertical contact-separation operation mode exhibits open-circuit voltages (Voc) of 17 V, 40 V, 25 V, 20 V, and 100 V for the target objects, respectively.

FIG. 21 includes graphs showing the open-circuit voltages (Voc) of a paper-based triboelectric nanogenerator according to an embodiment of the present disclosure when the paper-based triboelectric nanogenerator operates in a lateral-sliding operation mode.

FIG. 21 shows the open-circuit voltages (Voc) when the target objects are glass, paper for printing, cotton fabric, wood, and polyethyleneterephthalate (PET). As shown in FIG. 21, the triboelectric nanogenerator 100 operating in a lateral-sliding operation mode exhibits open-circuit voltages (Voc) of 5 V, 11 V, 4 V, 19 V, and 15 V for the target objects, respectively.

FIGS. 22 and 23 are images showing operation of a paper-based triboelectric nanogenerator according to an embodiment of the present disclosure in a lateral-sliding operation mode (LS).

Referring to FIG. 22, it can be seen that LCD is turned on when polyethyleneterephthalate (PET) is rubbed with the paper-based triboelectric nanogenerator 100 according to an embodiment of the present disclosure.

Referring to FIG. 23, it can be seen that LED is turned on when a wooden table is rubbed with the paper-based triboelectric nanogenerator 100 according to an embodiment of the present disclosure.

FIG. 24 illustrates a self-contact operation mode in which triboelectricity is generated by applying external pressure to a paper-based triboelectric nanogenerator according to an embodiment of the present disclosure when the paper-based triboelectric nanogenerator is folded and contacts itself.

FIG. 25 is a graph showing the open-circuit voltages (Voc) of a paper-based triboelectric nanogenerator according to an embodiment of the present disclosure when the paper-based triboelectric nanogenerator operates in a self-contact operation mode.

Referring to FIG. 25, it can be seen that triboelectricity is generated through contact and separation of the paper-based triboelectric nanogenerator 100.

FIGS. 26 to 28 show the shape and data values when a paper-based triboelectric nanogenerator according to an embodiment of the present disclosure is vertically laminated.

Referring to FIG. 26, it can be seen that triboelectricity is generated in space formed due to the relatively high surface roughness of the first and second surface areas 250 and 310 even when the paper-based triboelectric nanogenerators 100 according to an embodiment of the present disclosure are in contact with each other vertically so that the first and second surface areas 250 and 310 are always in contact with the first and second surface areas 250 and 310 located on the upper and lower sides.

FIG. 27 is a graph showing open-circuit voltages (Voc) generated when external pressure is periodically applied to the vertically laminated paper-based triboelectric nanogenerators 100.

FIG. 28 is a graph showing changes in the amount of charge according to the number of layers of the vertically laminated paper-based triboelectric nanogenerators 100 shown in FIG. 26.

Referring to FIG. 28, it can be seen that the number of layers of the laminated paper-based triboelectric nanogenerators 100 is proportional to the amount of charge.

FIGS. 29 and 30 show the shape and data values when a paper-based triboelectric nanogenerator according to an embodiment of the present disclosure of a self-contact operation mode is applied to the inside of a shoe.

FIG. 29 shows open-circuit voltages (Voc) over time during walking when the paper-based triboelectric nanogenerator 100 according to an embodiment of the present disclosure is applied inside a shoe.

FIG. 30 shows open-circuit voltages (Voc) over time during running when the paper-based triboelectric nanogenerator 100 is applied inside a shoe in the same manner as in FIG. 29.

Specifically, it can be confirmed that the paper-based triboelectric nanogenerator 100 exhibits higher open-circuit voltage (Voc) output when performing running action than when performing walking action, and that the paper-based triboelectric nanogenerator 100 exhibits open-circuit voltage (Voc) output more frequently during the same period when performing running action than when performing walking action.

FIG. 31 is a graph showing the open-circuit voltages (Voc) of a paper-based triboelectric nanogenerator according to an embodiment of the present disclosure when the human body moves with the paper-based triboelectric nanogenerator of a self-contact operation mode in a garment pocket.

FIGS. 32 and 33 show the shape and data values when a paper-based triboelectric nanogenerator according to an embodiment of the present disclosure of a self-contact operation mode is placed on a speaker.

As shown in FIGS. 32 and 33, in the case that a speaker on which the paper-based triboelectric nanogenerator 100 configured in the form of a self-contact operation mode is placed is operated, it can be seen that open-circuit voltages (Voc) are output when sound waves are generated from the speaker.

A positive triboelectric charge is formed on the surface of paper by sound waves and a positive triboelectric charge is formed on the surface of PVC, and then negative pressure separates the paper from the PVC, so that free electrons flow from an external circuit as internal dipole changes.

These results suggest that the paper-based triboelectric nanogenerator 100 according to an embodiment of the present disclosure may be used to harvest sonic energy.

FIGS. 34 to 36 show data when a paper-based triboelectric nanogenerator according to an embodiment of the present disclosure is applied to wind energy harvesting.

The paper-based triboelectric nanogenerator exhibits stable voltage output when resonant vibration due to wind force is applied.

FIG. 34 shows open-circuit voltages (Voc) when wind energy is applied to the paper-based triboelectric nanogenerator 100 according to an embodiment of the present disclosure.

FIG. 35 shows open-circuit voltages (Voc) generated by rectifying unstable output voltages due to wind energy when a bridge circuit is used in the paper-based triboelectric nanogenerator 100 according to an embodiment of the present disclosure.

FIG. 36 shows voltages over time at a 220 μF capacitor charged by applying the paper-based triboelectric nanogenerator 100 according to an embodiment of the present disclosure to wind energy harvesting.

According to embodiments of the present disclosure, a paper-based triboelectric nanogenerator capable of collecting energy by operating in various operation modes and a method of manufacturing the same can be provided.

According to embodiments of the present disclosure, a paper-based triboelectric nanogenerator that has a high degree of flexibility so that electrical characteristics thereof can be maintained even when mechanical deformation is repeatedly applied and that can normally operate even when the shape or size thereof is freely deformed and a method of manufacturing the same can be provided.

According to embodiments of the present disclosure, a paper-based triboelectric nanogenerator capable of being manufactured through simple and inexpensive processes and a method of manufacturing the same can be provided.

Meanwhile, embodiments of the present disclosure disclosed in the present specification and drawings are only provided to aid in understanding of the present disclosure and the present disclosure is not limited to the embodiments. It will be apparent to those skilled in the art that various modifications can be made to the above-described exemplary embodiments of the present disclosure without departing from the spirit and scope of the disclosure.

What is claimed is:

1. A paper-based triboelectric nanogenerator, comprising:
a sandwich structure comprising a first paper, conductive papers formed on the first paper and each comprising an electrode composed of a mesh-type conductive nanomaterial, and a second paper formed on the conductive papers; and
a polymer film formed in a selective area on the second paper,
wherein the number of the conductive papers formed on the first paper is two;
the two conductive papers are formed so as to be spaced apart from each other in a horizontal direction; and
the polymer film formed in the selective area is formed only in an upper area of one of the two conductive papers.

2. The paper-based triboelectric nanogenerator according to claim 1, wherein the paper-based triboelectric nanogenerator comprises a first surface area in which the polymer film is selectively formed on the second paper and a second surface area in which the second paper is exposed, and
generates triboelectricity through generation of an electrostatic charge due to difference in charge polarity between the first and second surface areas.

3. The paper-based triboelectric nanogenerator according to claim 2, wherein the paper-based triboelectric nanogenerator generates triboelectricity through physical pressure between the first and second surface areas and a target object.

4. The paper-based triboelectric nanogenerator according to claim 3, wherein the physical pressure of the paper-based triboelectric nanogenerator is pressure applied between the first and second surface areas and the target object by vertical motion.

5. The paper-based triboelectric nanogenerator according to claim 3, wherein the physical pressure of the paper-based triboelectric nanogenerator is pressure applied between the first and second surface areas and the target object by horizontal motion in a state wherein the first and second surface areas and the target object are in contact with each other.

6. The paper-based triboelectric nanogenerator according to claim 2, wherein a folding portion is located between the first and second electrodes formed so as to be spaced apart from each other, and self-contact and separation between the first and second surfaces are repeated by folding at the folding portion to generate triboelectricity.

7. The paper-based triboelectric nanogenerator according to claim 1, wherein the mesh-type conductive nanomaterial forming the conductive paper comprises at least one of metal nanowires, carbon nanotubes, graphene, and conductive nanopolymers.

8. The paper-based triboelectric nanogenerator according to claim 1, wherein the polymer film comprises at least one of polyvinyl chloride (PVC), polyethyleneterephthalate (PET), polyester (PE), polytetrafluoroethylene (PTFE), polydimethylsiloxane (PDMS), Kapton, polyimide (PI), nylon, polyvinyl alcohol (PVA), polyisobutylene, polyurethane elastic sponges, polyvinyl butyral, polychloroprene, natural rubber, polyacrylonitrile, polydiphenolcarbonate, polyether chloride, polyvinylidene chloride, polystyrene, polyethylene, and polypropylene (PP).

9. A method of manufacturing a paper-based triboelectric nanogenerator, comprising:

preparing a first paper;

attaching two conductive papers on the first paper so as to be spaced apart from each other;

attaching a second paper on the conductive papers to forma sandwich structure; and forming a polymer film on the sandwich structure.

10. The method according to claim 9, wherein the preparing comprises forming an electrode composed of a mesh-type conductive nanomaterial on a base paper using at least one process of dip-coating, screen-printing, spray-coating, and spin-coating.

\* \* \* \* \*